(12) United States Patent
Spriewald

(10) Patent No.: US 10,258,900 B2
(45) Date of Patent: Apr. 16, 2019

(54) DIVIDED WALL COLUMNS

(71) Applicant: Covestro Deutschland AG, Leverkusen (DE)

(72) Inventor: Jürgen Spriewald, Kölln-Reisiek (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 102 days.

(21) Appl. No.: 15/504,383

(22) PCT Filed: Aug. 19, 2015

(86) PCT No.: PCT/EP2015/069059
§ 371 (c)(1),
(2) Date: Feb. 16, 2017

(87) PCT Pub. No.: WO2016/026898
PCT Pub. Date: Feb. 25, 2016

(65) Prior Publication Data
US 2017/0239589 A1    Aug. 24, 2017

(30) Foreign Application Priority Data

Aug. 20, 2014    (CN) .......................... 2014 1 0429578

(51) Int. Cl.
*B01D 3/00*  (2006.01)
*B01D 3/14*  (2006.01)

(52) U.S. Cl.
CPC ............. *B01D 3/141* (2013.01); *B01D 3/008* (2013.01)

(58) Field of Classification Search
CPC .................................. B01D 3/141; B01D 3/008
(Continued)

(56) References Cited

U.S. PATENT DOCUMENTS 2,471,134 A    5/1949   Wright
4,230,533 A   10/1980   Giroux
(Continued)

FOREIGN PATENT DOCUMENTS

CN    101429089    8/2011
CN    203494195    3/2014
(Continued)

OTHER PUBLICATIONS

"Packed Tower Internals"; Bulletin KGMTIG-2. Rev. May 2018. Printed in USA. © 2018 Koch-Glitsch, LP. http://www.klmtechgroup.com/PDF/EGD2/ENGINEERING_DESIGN_GUIDELINES_process_flow_sheet_rev_web_pdf.
(Continued)

*Primary Examiner* — Charles S Bushey
(74) *Attorney, Agent, or Firm* — Donald R. Palladino

(57) ABSTRACT

A divided wall column includes: a column shell; a divided wall provided vertically inside the column shell, defining a divided wall section between an upper edge and a lower edge of the divided wall; and a liquid distributor provided within the divided wall section. The liquid distributor is fixed only to the column shell but not to the divided wall. By using the divided wall column, a defect involved in conventional divided wall columns, i.e. a maldistribution of fluid over mass transfer elements caused by a manufacturing defect of the divided wall resulted from its manufacturing process and/or a deformation thereof under operation conditions, can be minimized or even avoided.

10 Claims, 3 Drawing Sheets

(58) Field of Classification Search
USPC .......................................... 261/97, 110, 114.5
See application file for complete search history.

(56) References Cited

U.S. PATENT DOCUMENTS

| | | | |
|---|---|---|---|
| 5,755,933 A | 5/1998 | Ognisty et al. | |
| 5,914,012 A * | 6/1999 | Kaibel | B01D 3/14 159/DIG. 41 |
| 6,551,465 B1 | 4/2003 | Van Zile et al. | |
| 7,521,576 B2 | 4/2009 | Schal et al. | |
| 7,649,108 B2 | 1/2010 | Schal et al. | |
| 8,052,845 B2 | 11/2011 | Zuber et al. | |
| 8,092,655 B2 * | 1/2012 | Burst | B01D 3/141 159/43.1 |
| 8,480,860 B2 * | 7/2013 | Kovak | B01D 3/14 196/111 |
| 2003/0047438 A1 | 3/2003 | Tamura et al. | |
| 2003/0230476 A1 | 12/2003 | Brady et al. | |
| 2012/0103013 A1 * | 5/2012 | King | B01D 3/141 62/625 |

FOREIGN PATENT DOCUMENTS

| | | |
|---|---|---|
| GB | 2111852 | 7/1983 |
| JP | 3614245 | 1/2005 |
| WO | 2012049553 | 4/2012 |

OTHER PUBLICATIONS

"Packed Tower Internals Guide"; © 2001 Saint-Gobain NorPro Corporation Mar. 2001 TIG-2 http://razifar.com/cariboost_files/Packed_20Tower_20Internals_20Guide.pdf.

"Model 611 Deck Style Liquid Collector"; "Model 621 Trough Style Liquid Collector"; "Model 633 Chevron Vane Liquid Collector"; Koch-Glitsch; pp. 25-26, 2018.

"Kolmetz Handbook of Process Equipment Design Process Flow Sheet (Engineering Design Guidline)"; Karl Kolmetz et al.; Rev: 02; Nov. 2015; KLM Technology Group; pp. 1-29.

* cited by examiner

DIVIDED WALL COLUMNS

CROSS-REFERENCE TO RELATED APPLICATION

This application is a national stage application under 35 U.S.C. § 371 of PCT/EP2015/069059, filed Aug. 19, 2015, which claims the benefit of Chinese Application No. 201410429578.9, filed Aug. 20, 2014, both of which being incorporated by reference herein.

TECHNICAL FIELD

The present invention relates to a fractionation column. More specifically, the invention relates to a divided wall column (DWC) adapted for the separation of a mixture containing at least three components of different boiling points.

BACKGROUND ARTS

Fractionation is a well developed unit operation used in the petrochemical, chemical and petroleum refining industries to separate volatile chemical compounds. In conventional fractionation columns, the feed stream is normally divided into two product streams: an overhead product (i.e. a light product) and a bottoms product (i.e. a heavy product). But, it is sometimes desirable to separate a feedstream containing a plurality of components or constituents into three component portions or fractions. When the component fractions have sufficiently different boiling points, this can be readily accomplished as is known in the art by the use of two or more fractionation columns connected in series. However, the use of a plurality of columns necessitates the use of a corresponding number of reboilers, condensers and control equipments plus the piping interconnecting the two or more columns in series. A separation in a series of fractionation columns thus entails not only considerable expenditure on plants and equipments but also a considerable energy input. The operating costs of such a multi-stage fractionation process are correspondingly high.

To save the cost for separating a multi-component stream, it has been proposed in the art to use a single column which has a divided wall disposed generally vertically within the column to effect the separation of three constituent fractions. Such an apparatus is generally referred to as a divided wall column (DWC). The divided wall or Petlyuk configuration for fractionation columns was initially introduced some 60 years ago by Petlyuk et al. DWCs have been employed for the separation of hydrocarbon mixtures as evidenced by the disclosure of U.S. Pat. No. 2,471,134 issued to R. O. Wright. Recently the use of DWCs has begun to expand because of the greater recognition that in certain situations DWCs can provide benefits above those of conventional fractionation columns.

Up to now, a number of DWCs have been developed for various applications. Depending on the position of the divided wall within a divided wall column along its longitudinal axis, existing DWCs can be divided generally into three categories.

In a first type of DWCs, the divided wall is located in a rectifying section, i.e. an upper part, of the column, partitioning the rectifying section into two separated zones, so that at least two overhead (top) products and one bottoms product can be obtained using a single column. An example of such type of DWCs can be found in U.S. Pat. No. 5,755,933 which is incorporated herein by reference.

In a second type of DWCs, the divided wall is located in a middle part of the column, dividing the inner space of the column into four zones: a stripping zone below the divided wall, a rectifying zone above the divided wall, a pre-fractionation zone at one side of the divided wall, and a main fractionation zone at the opposite side of the divided wall. A multi-component feedstream is fed into the pre-fractionation zone, an overhead (top) product is drawn off from the rectifying zone, a bottoms product is drawn from the stripping zone, and an intermediate (middle) product is drawn off from the main fractionation zone.

Examples of such type of DWCs can be found in U.S. Pat. Nos. 2,471,134, 4,230,533, 6,551,465, 7,649,108, and 7,521,576, and U.S. Published Patent Application No. 2003/0230476, each of which is incorporated herein by reference.

In a third type of DWCs, the divided wall is located in a stripping section, i.e. a lower part, of the column, partitioning the stripping section into two separated zones, so that at least one overhead (top) product and two bottoms products can be obtained using a single column. Examples of such type of DWCs can be found in U.S. Pat. No. 5,755,933 and Chinese Pat. No. 203494195U, each of which is incorporated herein by reference.

In each type of DWCs, mass transfer elements, such as trays and packings, are generally provided in one or more zones to accomplish the separation process. In addition, to support the mass transfer elements or to further enhance the separation performances, some column internals, such as liquid collectors, ring channels, gas/liquid distributors, and support members, are provided, especially in the section where the divided wall is located (i.e. divided wall section). Such column internals are generally mounted by fixing at one end to the column wall and at the other end to the divided wall, so as to achieve a secure fixation. However, such a configuration of column internals may cause some problems. For example, due to a manufacturing defect of the divided wall and/or a deformation thereof under high temperatures and/or stress during operation, a mis-alignment of column internals fixed to the divided wall may occur. Such a mis-alignment of column internals, such as gas/liquid distributors, may cause maldistribution of vapor or liquid materials over mass transfer elements like fractionation trays and/or packing, thereby deteriorating the overall separation performance of the column.

Therefore, there remains a need for a novel divided wall column, in which the above defect present in the prior art can be avoided.

SUMMARY OF THE INVENTION

An object of the invention is to provide a divided wall column capable of separating a feedstream containing at least three components of different boiling points into at least three products, in which the impact of any manufacture defect and any deformation of the divided wall to the overall performance of the column is minimized, or even avoided.

The above object of the invention can be accomplished by decoupling column internals, such as liquid distributors, provided within a divided wall section of a column from the divided wall, so that any manufacture defect and any deformation of the divided wall would have little or no impact to the alignment of the column internals, which is important for the function and the separation performance of the column.

In an aspect, the present invention provides a divided wall column, comprising:
    a column shell,
    a divided wall provided vertically inside the column shell, defining a divided wall section between an upper edge and a lower edge of the divided wall, and
    a liquid distributor provided within the divided wall section,
    characterized in that, the liquid distributor is fixed only to the column shell but not to the divided wall.

In the column of the present invention, by decoupling the liquid distributor from the divided wall, any manufacturing defect of the divided wall and any deformation thereof under high temperatures and/or high stress would have little or no impact to the alignment of the liquid distributor, and thus would have little or no influence on the distribution of vapor and/or liquid stream within the divided wall section, which in turn maintains a stable performance of the column even over a long period of operation.

BRIEF DESCRIPTION OF THE DRAWINGS

Other objects and advantages of the present invention will become apparent from the following detailed description taken in connection with the accompanying drawings which are set forth by way of illustration of certain embodiments of the present invention.

DETAILED DESCRIPTION OF THE INVENTION

Figure 1:
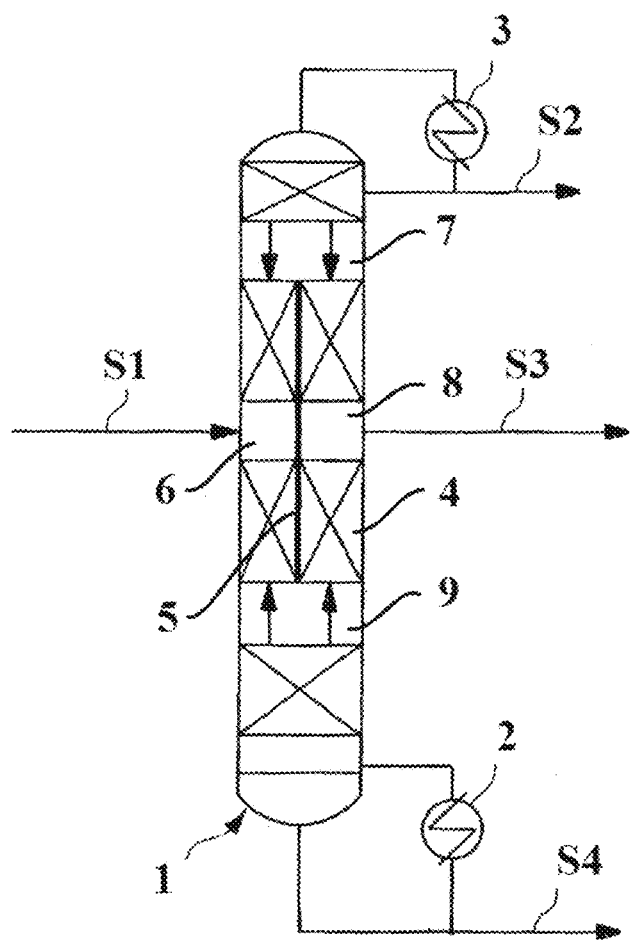
FIG. 1 is a schematic illustration of a divided wall column according to an embodiment of the present invention.

As described above, the present invention relates to an improvement to existing DWCs, in which column internals provided in the divided wall section are decoupled from the divided wall, so that the impact of any manufacturing defect and any deformation of the divided wall to the alignment of the column internals is minimized or even avoided.

In an aspect, the present invention provides a divided wall column, comprising:
    a column shell,
    a divided wall provided vertically inside the column shell, defining a divided wall section between an upper edge and a lower edge of the divided wall, and
    a liquid distributor provided within the divided wall section,
    characterized in that, the liquid distributor is fixed only to the column shell but not to the divided wall.

In some embodiments according to the present invention, the column comprises a plurality of liquid distributors provided in a parallel manner within the divided wall section. There is no specific limitation to the liquid distributor used in the present invention, that is, any liquid distributor suitable for use in a fractionation column can be used in the divided wall column of the present invention.

In the column of the present invention, there is no specific limitation to the longitudinal position of the divided wall within the column shell, that is, the divided wall can be located at any position along the longitudinal axis of the column shell. In preferred embodiments according to the present invention, the column may comprise one or more divided walls, each provided individually, inside the column shell, in one of the following manners: i) in an upper part of the column shell with a connection to a side wall and a top cap of the shell; ii) in a middle part of the column shell with a connection to a side wall of the shell, and iii) in a lower part of the column shell with a connection to a side wall and a bottom cap of the shell. In further preferred embodiments according to the present invention, the column may have a structure as described for any of the three types of DWCs as described hereinbefore. In most preferred embodiments according to the present invention, the column may have a structure as the second type of divided wall columns as described hereinbefore. In a particular embodiment, the divided wall is provided in the middle part of the column shell, dividing the inner space of the column shell into four zones: a stripping zone below the divided wall section, a rectifying zone above the divided wall section, a pre-fractionation zone at one side of the divided wall within the divided wall section, and a main fractionation zone at the opposite side of the divided wall within the divided wall section, wherein the liquid distributor is provided within the pre-fractionation zone and/or the main fractionation zone.

In the column of the present invention, the divided wall section is partitioned by the divided wall into at least two zones, with each zone being the same or different in cross-sectional area. In a preferred embodiment, the divided wall section is partitioned into two zones with the same cross-sectional areas. In another preferred embodiment, the divided wall section is partitioned into two zones with different cross-sectional areas.

In some preferred embodiments according to the present invention, the column is equipped with at least one reboiler and/or at least one condenser. The reboiler can be of any of the types commonly found in the chemical industry, including, but not limited to, falling-film evaporators, forced circulation evaporators, pool boiling (kettle) evaporators, natural circulation evaporators, etc. The condenser can be of any of the types in common use in the chemical industry including, but not limited to, co-current and countercurrent (knockback) condensers.

In some preferred embodiments according to the present invention, the column can be equipped with any mass transfer element commonly used in the chemical industry. Examples include, but not limited to, sieve trays, valve trays, bubble cap trays, as well as structured and random packings. In a further preferred embodiment according to the present invention, the column is provided, within the divided wall section, with a mass transfer element comprising structured packings.

In some preferred embodiments according to the present invention, the column may further comprise a column internal, other than the liquid distributor, provided within the divided wall section, and the column internal is preferably fixed only to the column shell but not to the divided wall. The column internal can be of any of the types commonly used in fractionation columns, including, but not limited to, liquid collectors, ring channels, and packing supports.

In the column of the present invention, the liquid distributor and/or the column internal, if present, can be fixed to the column shell in any manner commonly used in the art, including, but not limited to, welding, bolting, and/or riveting.

The column of the present invention is suitable for use in any separation processes that can be carried out in an existing divided wall column, such as the separation processes disclosed in U.S. Pat. Nos. 7,521,576B, 7,649,108B, US 20030230476A, CN 203494195U, and CN 101429089A, each of which is incorporated herein by reference. For example, the column of the present invention is suitable for use in the separation of a mixture comprising 2,2'-diisocyanato-diphenyl-methane, 2,4'-diisocyanatodiphenylmethane and 4,4'-diisocyanatodiphenyl-methane resulted from phosgenation of aniline/formaldehyde condensates; a mixture comprising toluenediisocyanate (TDI), TDI-residue, hydrolysable chloride compounds, and o-dichlorobenzene resulted from the TDI production, and a mixture comprising toluene, ethylbenzene and styrene resulted from styrene production.

FIG. 1 shows schematically a divided wall column according to an embodiment of the present invention, which comprises a column shell 1, a reboiler 2, a condenser 3, mass transfer elements 4, and a substantially fluid tight divided wall 5 extending vertically through a middle part of the column shell 1. The inner space of the column shell 1 is divided by the divided wall 5 into four distinct operating zones, i.e. a pre-fractionation zone 6 at one side of the divided wall, a rectifying zone 7 above the divided wall, a main fractionation zone 8 at the opposite side of the divided wall 5, and a stripping zone 9 below the divided wall, in which the pre-fractionation zone 6 together with the main fractionation zone 8 forms a divided wall section. A multi-component feedstream S1 is introduced into the pre-fractionation zone 6, typically in a middle portion thereof, and then separated via mass transfer within the four operating zones into three product streams, i.e. a light product stream S2 withdrawn from the rectifying zone 7, an intermediate product (i.e. a side-stream product) stream S3 withdrawn from the main fractionation zone 8, and a heavy product stream S4 withdrawn from the stripping zone 9. As indicated by the arrows, vapor leaving the stripping zone 9 and liquid leaving the rectifying zone 7 flow into the pre-fractionation zone 6 and the main fractionation zone 8, and contact with each other and any other stream, if present, to effect a mass transfer. Also, vapor leaving the pre-fractionation zone 6 and the main fractionation zone 8 enters the rectifying zone 7 and liquid leaving the pre-fractionation zone 6 and the main fractionation zone 8 enters the stripping zone 9 (not shown).

As can be seen from FIG. 1, each zone is equipped with a mass transfer element 4 intended to promote the separation. The type and/or design of the mass transfer elements 4 may vary among the four zones, such as between the pre-fractionation zone 6 and the main fractionation zone 8 within the divided wall section. For example, in the case of trays, the type, size and spacing of the trays may vary in different zones. And, in the case of packings, the shape, size, porosity and packing density of the packings may vary in different zones. Furthermore, each zone within the column may comprise one or more types of mass transfer elements, such as any one or a combination of any two or more selected from the group consisting of sieve trays, valve trays, bubble cap trays, structured packings and random packings.

Also as can be seen from FIG. 1, the divided wall is located substantially in the center of the divided wall section, so that the pre-fractionation zone 6 and the main fractionation zone 8 may have substantially the same cross-sectional areas. However, as can be appreciated by those skilled in the art, depending on the intended application, different cross-sectional areas of the pre-fractionation zone 6 and the main fractionation zone 8 may also be selected. The length of the divided wall depends on the process conditions and on the properties of the mass transfer element used, and can be readily determined by those skilled in the art. For example, the length of the divided wall may be in a range from ¼ to ⅔ of the total length of the mass transfer region established inside the column shell.

Figure 2:
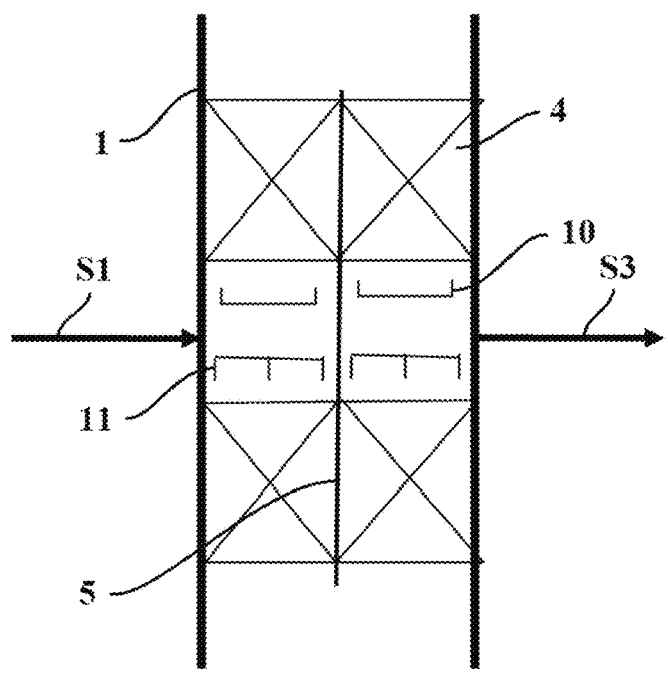
FIG. 2 is a partial expanded view of the column as shown in FIG. 1, showing schematically its divided wall section.

FIG. 2 shows schematically the divided wall section of the divided wall column as shown in FIG. 1. As can be seen, liquid collectors 10 and liquid distributors 11 are provided in the spaces between two mass transfer elements 4 arranged within the divided wall section. It can be appreciated that liquid from an upper mass transfer element 4 is collected in the liquid collector 10, and then redistributed by the liquid distributor 11 over a lower mass transfer element 4. Optionally, other column internals (not shown), such as ring channels, support members for mass transfer elements 4 and the like, can also be provided within the divided wall section to promote the separation.

Figure 3:
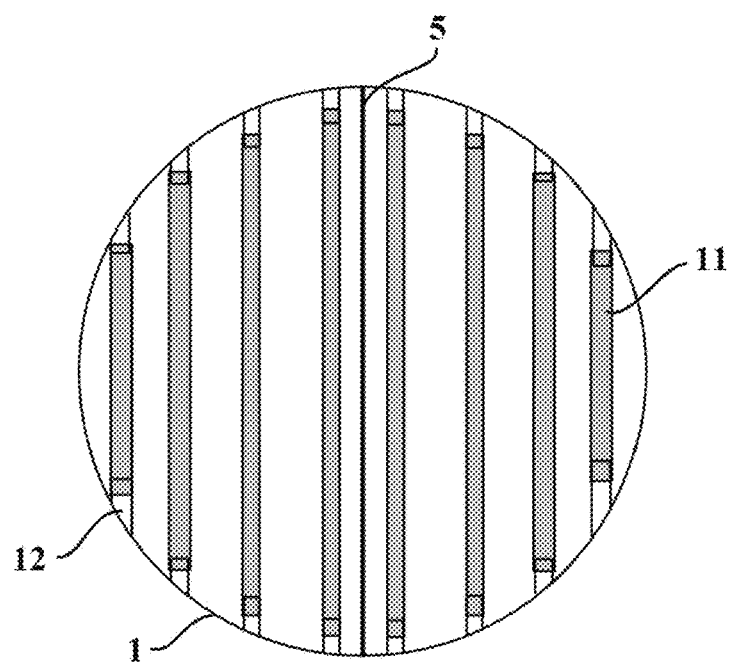
FIG. 3 is a cross-section view of the divided wall section as shown in FIG. 2, showing schematically the arrangement of liquid distributors within the divided wall section.

FIG. 3 shows schematically a cross-section of the divided wall section as shown in FIG. 2, at the level of the liquid distributors 11. As can be seen, a plurality of liquid distributors 11 are provided within the divided wall section in a manner substantially parallel to the divided wall 5, with both ends of the liquid distributors 11 fixed to clips or weld-in parts 12 provided on the column shell 1. The fixation between the liquid distributors 11 and the clips or weld-in parts 12 may be selected from the group consisting of welding, bolting and/or riveting. It can be appreciated that, due to the decoupling of the liquid distributors 11 from the divided wall 5, any manufacturing defect of the divided wall 5 resulted from its manufacturing process and any deformation thereof under high temperatures and/or high stress during operation may have substantially no impact to the alignment of the liquid distributors 11, and thus have essentially no impact to the distribution of liquid by the liquid distributors 11 over mass transfer elements 4 below.

Figure 4:
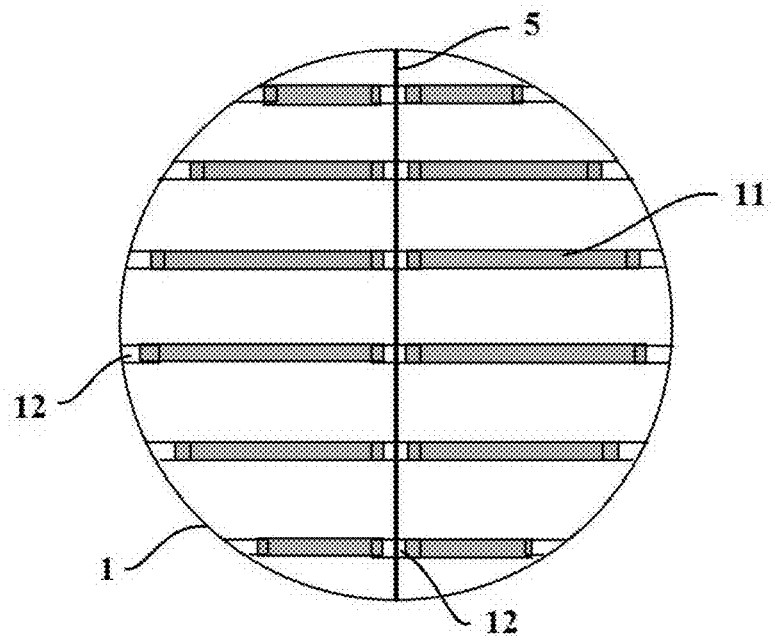
FIG. 4 is a cross-section view of a conventional divided wall column, showing schematically the arrangement of liquid distributors within the divided wall section.

FIG. 4 shows schematically a cross-section of the divided wall section, at the level of the liquid distributors 11, of a conventional divided wall column. As can be seen, a plurality of liquid distributors 11 are provided within the divided wall section in a manner substantially parallel to each other but perpendicular to the divided wall 5, with one end of the liquid distributors 11 fixed to clips or weld-in parts 12 provided on the column shell 1 and the other end of the liquid distributors 11 fixed to clips or weld-in parts 12 provided on the divided wall 5.

Figure 5:
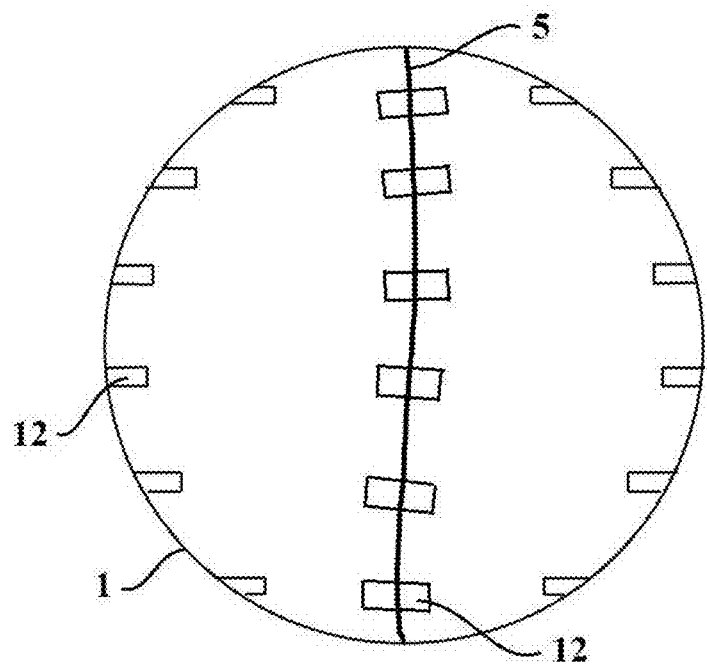
FIG. 5 is a cross-section view of a conventional divided wall column, showing schematically the deformation of the divided wall, in which the liquid distributors have been omitted for clarity.

FIG. 5 shows schematically a cross-section of the divided wall section, at the level of the liquid distributors 11, of a conventional divided wall column, in which the divided wall 5 is deformed. The liquid distributors 11 are omitted from FIG. 5 for clarity. It can be seen, due to the deformation of the divided wall 5, the position and orientation of the clips or weld-in parts 12 provided on the divided wall 5 are changed, which in turn will cause a misalignment of the liquid distributors 11 (not shown). And, it can be appreciated that the misalignment of the liquid distributors 11 will lead to a maldistribution of liquid materials over mass transfer elements 4 below, and finally incur a loss of overall separation performance of the divided wall column.

EXAMPLES

The following examples are provided only for the purpose of illustration, and should not be construed as limiting.

Example 1

A distillation using a divided wall column according to an embodiment of the invention as illustrated in FIG. 1 to FIG. 3 was performed. Fabric packings with 500 m$^2$/m$^3$ specific surface area were used as mass exchange elements 4 in the divided wall column. 40 wt. % of the liquid was introduced to the pre-fractionating zone 6 and 60 wt. % to the main fractionating zone 8. The rectifying zone 7 and the stripping zone 9 each had 8 theoretical stages, the pre-fractionating zone 6 had 12 theoretical stages at the top and 14 theoretical stages at the bottom, the main fractionating zone 8 had 16 theoretical stages at the top and 14 theoretical stages at the bottom, wherein the theoretical stages at the top and at the bottom, here and in the following, mean the theoretical separating stages above and below the supply point for the feed stream S1 in the pre-fractionating zone 6 or above and below the withdrawal point of the side stream S3 in the main fractionating zone 8, respectively. The head pressure was 6 mbar. The reflux ratio at the withdrawal point of the overhead stream was 56:1, and the reflux ratio at the withdrawal point of the side stream was 3.7:1.

12.5 kg/h of a feed stream S1 composed of 3.0 wt. % 2,2'-MDI, 50.0 wt. % 2,4'-MDI and 47.0 wt. % 4,4'-MDI were fed to the divided wall column within the pre-fractionating zone 6, at the 13th stage from the top. Three product streams were withdrawn from the divided wall column: 0.6 kg/h of a top stream S2 composed of 56.4 wt. % 2,2'-MDI, 43.5 wt. % 2,4'-MDI and 0.1 wt. % 4,4'-MDI; 5.5 kg/h of a side stream S3 composed of 0.1 wt. % 2,2'-MDI, 97.5 wt. % 2,4'-MDI and 2.4 wt. % 4,4'-MDI; and 6.4 kg/h of a bottom stream S4 with an isomer purity of 90 wt. % of 4,4'-MDI and 10 wt. % 2,4'-MDI. The side stream S3 was withdrawn after the 16th separation stage from the top in the main fractionating zone 8.

The distillation process was continued for 48 months, during which the composition of the products obtained and the overall separation capacity of the column remained stable.

Comparative Example 1

A distillation was performed in the same manner as described in Example 1, except that a divided wall column having an arrangement of liquid distributors as illustrated in FIG. 4 was used in place of the column used in Example 1 having an arrangement of liquid distributors as illustrated in FIG. 3.

12.5 kg/h of a feed stream S1 composed of 3.0 wt. % 2,2'-MDI, 50.0 wt. % 2,4'-MDI and 47.0 wt. % 4,4'-MDI were fed to the divided wall column within the pre-fractionating zone 6, at the 13th stage from the top. At the very beginning of the operation, three product streams with substantially the same compositions as those obtained in Example 1 were withdrawn from the divided wall column. Shortly after, a deterioration of the separation performance of the column was observed from the change of the compositions of the products obtained, in which the composition of the top stream S2 was changed to 55.5 wt. % 2,2'-MDI, 44.4 wt. % 2,4'-MDI and 0.1 wt. % 4,4'-MDI; the composition of the side stream S3 was changed to 0.2 wt. % 2,2'-MDI, 97.1 wt. % 2,4'-MDI and 2.7 wt. % 4,4'-MDI; and the composition of the bottom stream S4 was changed to 89.5 wt. % 4,4'-MDI and 10.5 wt. % 2,4'-MDI. To meet the requirements of product specification, the reflux ratio at the withdrawal point of the overhead stream was increased 30% and the reflux ratio at the withdrawal point of the side stream was also increased 30%. Due to the increased reflux ratios, the feed rate of the feed steam had to be decreased from 12.5 kg/h to 8-9 kg/h, indicating a 30% loss of the separation capacity of the column.

The invention claimed is:

1. A divided wall column, comprising:
   a column shell;
   a divided wall provided vertically inside the column shell, defining a divided wall section between an upper edge and a lower edge of the divided wall;
   a liquid distributor provided within the divided wall section; and
   a column internal provided within the divided wall section, which internal is different from the liquid distributor and is fixed only to the column shell but not to the divided wall,
   wherein the liquid distributor is fixed only to the column shell but not to the divided wall and the column internal is selected from the group consisting of a liquid collector, a ring channel, a packing support, or a combination thereof.

2. The divided wall column of claim 1, wherein the column is provided, within the divided wall section, with a plurality of liquid distributors arranged in a parallel manner.

3. The divided wall column of claim 1, wherein the divided wall is provided in one or more of the following manners:
   i) in an upper part of the column shell with a connection to a side wall and a top cap of the shell;
   ii) in a middle part of the column shell with a connection to a side wall of the shell, and
   iii) in a lower part of the column shell with a connection to a side wall and a bottom cap of the shell.

4. The divided wall column of claim 1, wherein the divided wall is provided in a middle part of the column shell, dividing the inner space of the column shell into four zones: a stripping zone below the divided wall section, a rectifying zone above the divided wall section, a pre-fractionation zone at one side of the divided wall within the divided wall section, and a main fractionation zone at the opposite side of the divided wall within the divided wall section, wherein the liquid distributor is provided within the pre-fractionation zone and/or the main fractionation zone.

5. The divided wall column of claim 1, wherein the divided wall column further comprises a mass transfer element selected from trays and packings.

6. The divided wall column of claim 1, wherein the divided wall column further comprises, within the divided wall section, a mass transfer element comprising structured packings.

7. The divided wall column claim 1, wherein the liquid distributor is fixed to the column shell by welding, bolting, and/or riveting.

8. The divided wall column of claim 5, wherein the divided wall column comprises trays selected from sieve trays, valve trays and bubble cap trays.

9. The divided wall column of claim 5, wherein the divided wall column comprises packings selected from structured packings and random packings.

10. The divided wall column of claim 1, wherein the column internal is fixed to the column shell by welding, bolting and/or riveting.

\* \* \* \* \*